US011176245B2

(12) United States Patent
Nunez Mencias et al.

(10) Patent No.: US 11,176,245 B2
(45) Date of Patent: Nov. 16, 2021

(54) PROTECTING WORKLOADS IN KUBERNETES

(71) Applicant: International Business Machines Corporation, Armonk, NY (US)

(72) Inventors: Angel Nunez Mencias, Stuttgart (DE); Peter Morjan, Boeblingen (DE); Dirk Herrendoerfer, Sindelfingen (DE); Preethi Polepalli Yeshwanth, Alpharetta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 16/587,256

(22) Filed: Sep. 30, 2019

(65) Prior Publication Data

US 2021/0097169 A1 Apr. 1, 2021

(51) Int. Cl.
*G06F 21/53* (2013.01)
*G06F 21/60* (2013.01)

(52) U.S. Cl.
CPC ............ *G06F 21/53* (2013.01); *G06F 21/602* (2013.01); *G06F 2221/033* (2013.01)

(58) Field of Classification Search
CPC .. G06F 21/53; G06F 21/602; G06F 2221/033; G06F 21/6209
See application file for complete search history.

(56) References Cited

U.S. PATENT DOCUMENTS

| 2012/0173871 | A1* | 7/2012 | Ashok | G06F 21/575 |
| | | | | 713/153 |
| 2019/0042759 | A1* | 2/2019 | Smith | G06F 9/45558 |
| 2019/0095253 | A1 | 3/2019 | Curtis et al. | |
| 2020/0257814 | A1* | 8/2020 | El-Moussa | G06F 21/6218 |

(Continued)

FOREIGN PATENT DOCUMENTS

| CN | 107864131 A | 3/2018 |
| CN | 108108223 A | 6/2018 |
| CN | 108989091 A | 12/2018 |

(Continued)

OTHER PUBLICATIONS

Arnautov, S. et al., "SCONE: Secure Linux Containers with Intel SGX," Proceedings of the 12th USENIX conference on Operating Systems Design and Implementation (OSDI'16). USENIX Association, Berkeley, CA, USA, pp. 689-703.

(Continued)

*Primary Examiner* — Meng Li
(74) *Attorney, Agent, or Firm* — Cantor Colburn LLP; Edward Wixted

(57) ABSTRACT

Aspects of the invention include obtaining, via a processor, an original docker image from a customer, encrypting a disk image using content from the original docker image and encrypting a bootloader. A re-packaged image is created using the encrypted disk image and the secure encrypted bootloader. The re-packaged image is deployed by inserting the re-package image into a pod container and by means of using a mutating webhook, granting elevated privileges to (Continued)

said container and creating a secured Kubernetes pod for protecting workloads, wherein the secured Kubernetes pod has at least one virtual machine containing the pod container.

20 Claims, 5 Drawing Sheets

(56) References Cited

U.S. PATENT DOCUMENTS

2020/0356673 A1\* 11/2020 Xu ................. H04L 9/0897

FOREIGN PATENT DOCUMENTS

| CN | 110007933 A | 7/2019 |
|----|-------------|--------|
| EP | 3267351 A1  | 1/2018 |

OTHER PUBLICATIONS

Fernandez, G. & Brito, A., "Secure Container Orchestration in the Cloud: Policies and Implementation," Proceedings of the 34th ACM/SIGAPP Symposium on Applied Computing (SAC '19). ACM, New York, NY, USA, pp. 138-145.
Bernstein, David, "Containers and Cloud: From LXC to Docker to Lubemetes", IEEE Cloud Computing, vol. 1, Sep. 30, 2014, pp. 81-84.
International Search Report and Written Opinion for International Application No. PCT/IB2020058231; International Filing Date: Sep. 4, 2020; dated Dec. 16, 2020, 7 pages.
Zhou, Shunli et al., "PAAS platform based on improved Kubernetes technology" Jiangsu Communication, Jun. 30, 2019, 5 Pages.

\* cited by examiner

PROTECTING WORKLOADS IN KUBERNETES

BACKGROUND

The present invention generally relates to Kubernetes security, and more specifically, to protecting workloads in Kubernetes.

Kubernetes is an open-source container-orchestration system for automating application-deployment, scaling, and management. Kubernetes defines a set of building blocks, referred to as primitives, which collectively provide mechanisms that deploy, maintain, and scale applications based on processor, memory, or custom metrics. A pod is a Kubernetes building block that includes one or more containers that are co-located on a host machine and that can share resources. A node, which may be a virtual machine (VM) or physical machine, is a worker machine in Kubernetes that includes one or more pods. Each node contains the services necessary to run the pods. Kubernetes, to this day, does not support any security model separating the work items in the pods from the control of the Kubernetes administrator. Furthermore, the Kubernetes workloads in the pods are not secured, locked down, or encrypted in any way to protect the data of the workload, hence the customer from being accessed by the Kubernetes administrator.

Kubernetes (Kubernetes is a trademark of Google, Inc.), in its native form does not support any virtualization technology, or the elevation of capabilities of a pod's workload to enable such features since the separation between host and container workloads is done via Linux control groups.

SUMMARY

Embodiments of the present invention are directed to protecting workloads in Kubernetes. A non-limiting example computer-implemented method includes obtaining, via a processor, an original docker image from a customer, encrypting a disk image using content from the original docker image and securely encrypting a bootloader. A re-packaged image is created using the encrypted disk image and the secure encrypted bootloader. The re-packaged image is deployed by inserting the re-packaged image into a pod container and creating a secured Kubernetes pod for protecting workloads, wherein the secured Kubernetes pod has at least one virtual machine containing the pod container.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

One or more embodiments of the present invention allows for finer granular protection of individual workloads in a Kubernetes cluster by providing a new security boundary for individual containers in a Kubernetes pod. This allows administrators to manage a Kubernetes cluster with full transparency and existing tooling.

One or more embodiments of the present invention prevent a single workload from breaking through a container's vulnerability to read data from other pods in the same Kubernetes worker.

One or more embodiments of the present invention include having a sidecar container provisioned for each pod deployed on a Kubernetes cluster to assist in provisioning a runq environment for all the containers of the pod.

One or more embodiments of the present invention provide protection for a pod's memory and storage from a host operating system (OS).

One or more embodiments of the present invention allows for the protection of bare metal servers (e.g., logical partitions or "LPARs"), virtual machines, individual docker containers and whole Kubernetes clusters.

Figure 1:
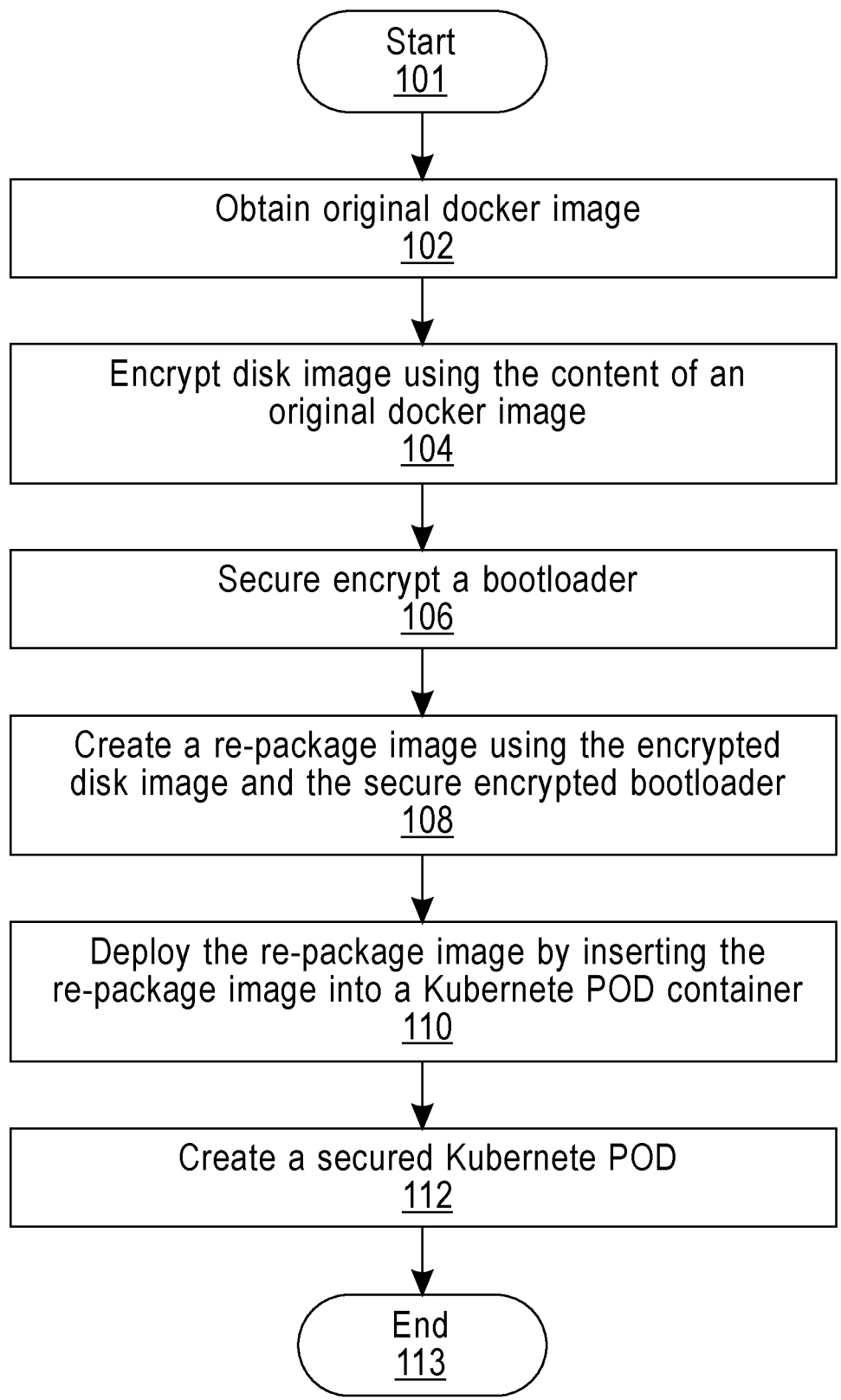
FIG. 1 illustrates a flow diagram of a process for protecting workloads in kubernetes in accordance with one or more embodiments of the present invention.

Turning now to FIG. 1, a flow diagram of an overall process for protecting workloads in Kubernetes is generally shown in accordance with one or more embodiments of the present invention. The process starts at block 101 and obtains an original docker image at block 102. A docker image is an image of a docker container, which is an open source software development platform. The docker container allows the service function to be portable among any system running the Linux OS. Once the original docker image is obtained, the process encrypts a disk image at block 104 using the content of the original docker image. The process then encrypts a bootloader at block 106. Booting an OS configuration on a computing system where kernel parameters are hardcoded can include passing the OS kernel to a bootloader. This can cause the bootloader to load and execute the OS kernel on the computing system. Similarly, booting an OS configuration, where one or more kernel parameter value is stored in a data object separate from the OS kernel, can include passing both the operating system kernel and one or more kernel parameter values to a bootloader. This causes the bootloader to load and execute the OS kernel with the one or more kernel parameter values.

Still referring to FIG. 1, the process then creates a re-package image at block 108 using the encrypted disk image and the secure encrypted bootloader. Re-packaging includes loading the existing docker image, then encrypting the storage layers of the docker image, which includes a secure encrypted bootloader and a re-build the docker image. The re-packaged image is deployed at block 110 by inserting the re-packaged image into a Kubernetes pod container. The process then creates a secured Kubernetes pod at block 112 and ends at block 113. Today's application environments tend to use containers and microservices as an architectural paradigm. In that scheme, a particular selection of microservices running as containers are grouped together in a pod, thereby forming, for example, an application or solution.

A secured Kubernetes pod runs in a secure execution mode, thereby having memory isolated from the underlying host environment. Also when it is run as a runq container, a cluster administrator will not have console access to the pods. This provides protection from all human users.

Figure 2:
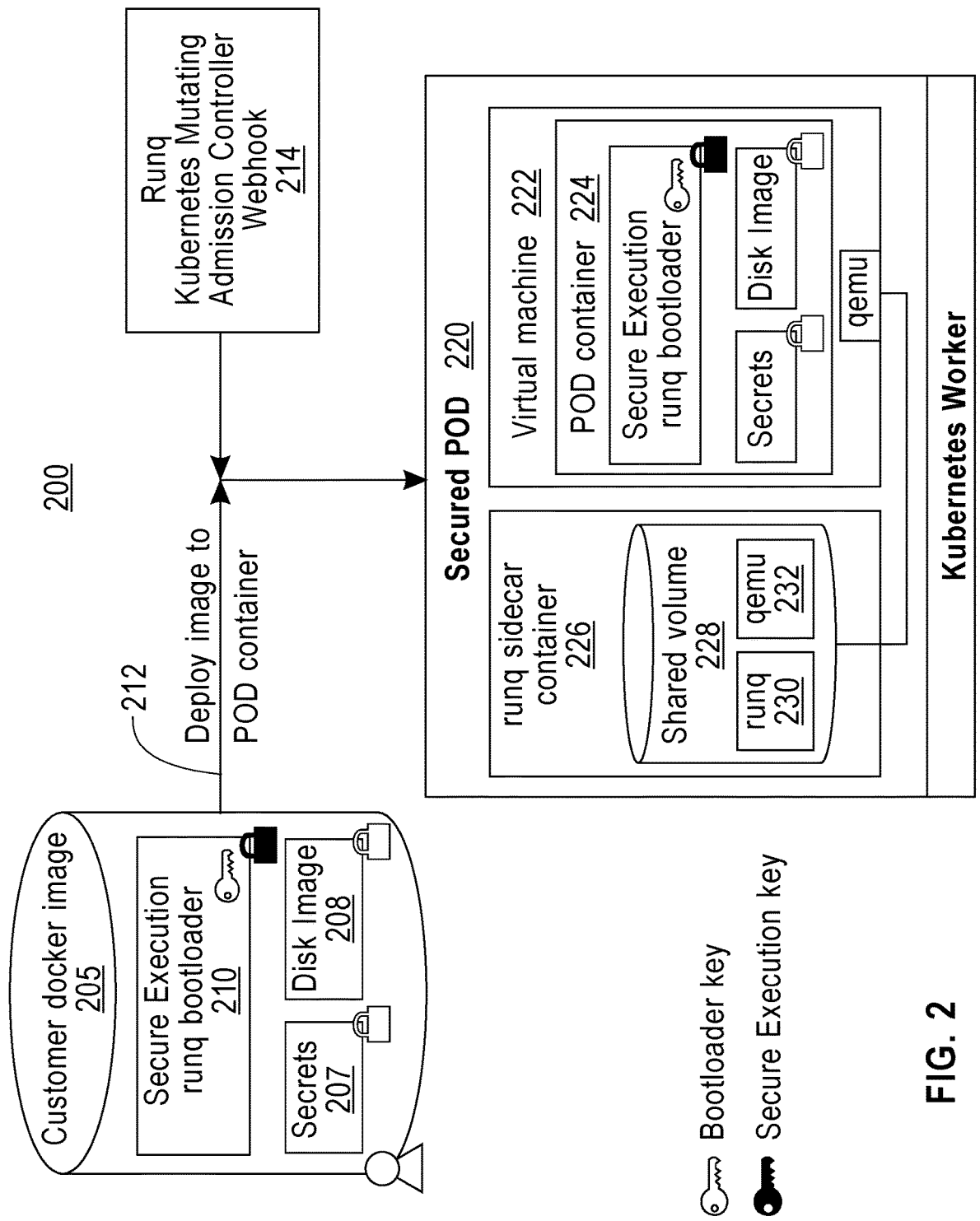
FIG. 2 illustrates a diagram of components used for protecting workloads in kubernetes in accordance with one or more embodiments of the present invention.

Turning now to FIG. 2, a diagram 200 of components for protecting workloads in Kubernetes is generally shown in accordance with one or more embodiments of the present invention. A customer docker image 205 contains customer secrets 207, a disk image 208 and a secure execution runq bootloader 210. It is noted that the runq bootloader 210 has a unique key to decrypt the encrypted disk and it prepares the environment for the docker container to run without changes. Runq is a hypervisor based docker runtime. Runq prepares a container having resources for provisioning a Quick Emulator (qemu) hypervisor. The docker image is deployed 212 into a pod container using a runq Kubernetes mutating admission controller 214 having webhook. The mutating webhook is a service to mutate the definition of a deployment request while at the same time providing flexibility to customize admission logic before deployment. Webhook ensures that only trusted code can run in privileged mode. Upon deployment of the customer docker image into the secured Kubernetes POD 220, it is placed into a pod container 224 that is part of virtual machine 222. The secured Kubernetes pod 220 further includes a runq sidecar container 226. The runq sidecar container 226 includes a shared volume 228 having both runq 230 and qemu 232. From the Kubernetes host point of view the virtual machine is a black box. For example, an administrator trying to peek into the Kubernetes worker only sees a qemu process, memory of the qemu process is encrypted when read from the Kubernetes, and data is saved as an encrypted volume into the Kubernetes volumes which are assigned to the pod.

Figure 3:
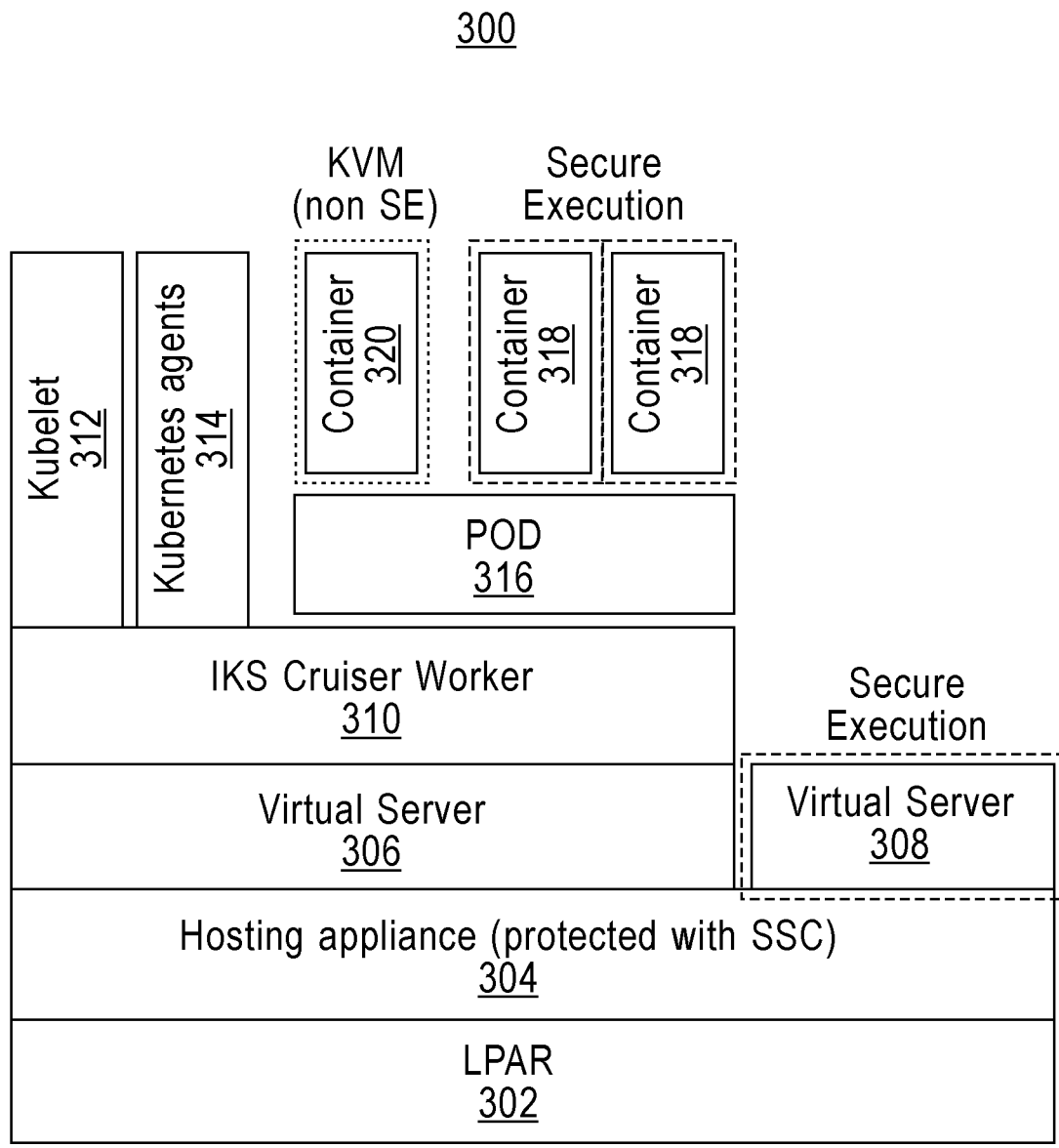
FIG. 3 illustrates an implementation for protecting workloads in kubernetes in accordance with one or more embodiments of the present invention.

Turning now to FIG. 3, examples of virtual servers 300 using secure execution for protecting workloads in Kubernetes are generally shown in accordance with one or more embodiments of the present invention. The hypervisor logical partition (LPAR) 302 is the base for a hosting appliance 304. The hosting appliance 304 runs virtual servers. One virtual server 308 uses secure execution for protection. Another virtual server 306 runs Interval Key Server (IKS) cruiser worker platform 310. IKS cruiser worker platform 310 is the worker node of Kubernetes cluster where the customer deployments are finally hosted. The administrator will not have any access to a cruiser worker. A carrier worker is the management worker node which can be accessed by administration for service and maintainability purposes. The IKS cruiser worker platform 310 has a Kubelet 312 and a Kubernetes agent 314. Kubelet 312 is a node agent that runs on every node of the Kubernetes cluster. It makes sure the pods are running as defined in the pod specifications. Kubernetes pod 316 has several containers, a kernel-based virtual machine (KVM) non-secured container 320 and two secured containers 318. Each secure container 318 in the pod is isolated with secure execution. Each pod container is protected from other containers, Kubernetes components, underlying host, and cloud administrator. Each virtual server 306 is protected from other virtual servers and hosting appliance 304. In this embodiment, the KVM can be executed with or without secure execution.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
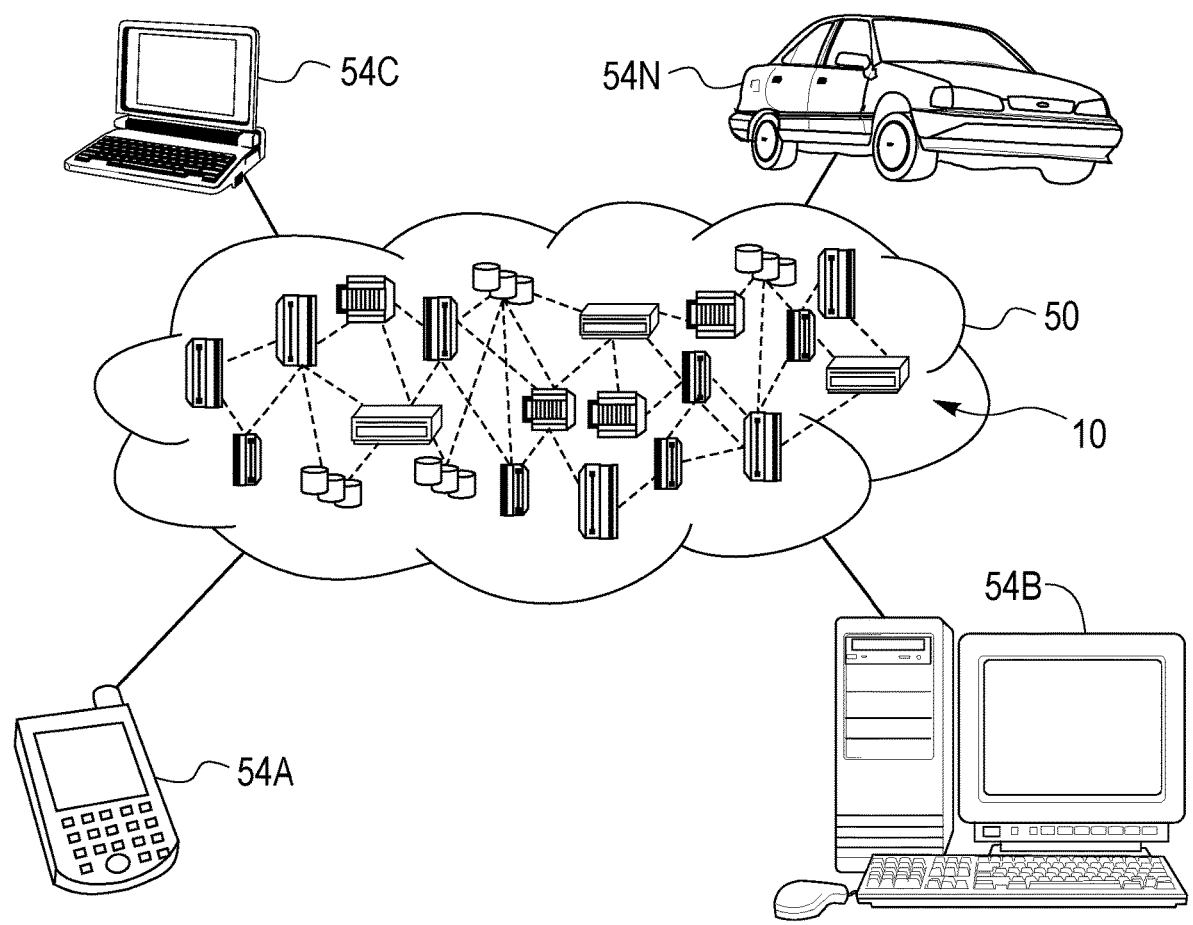
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
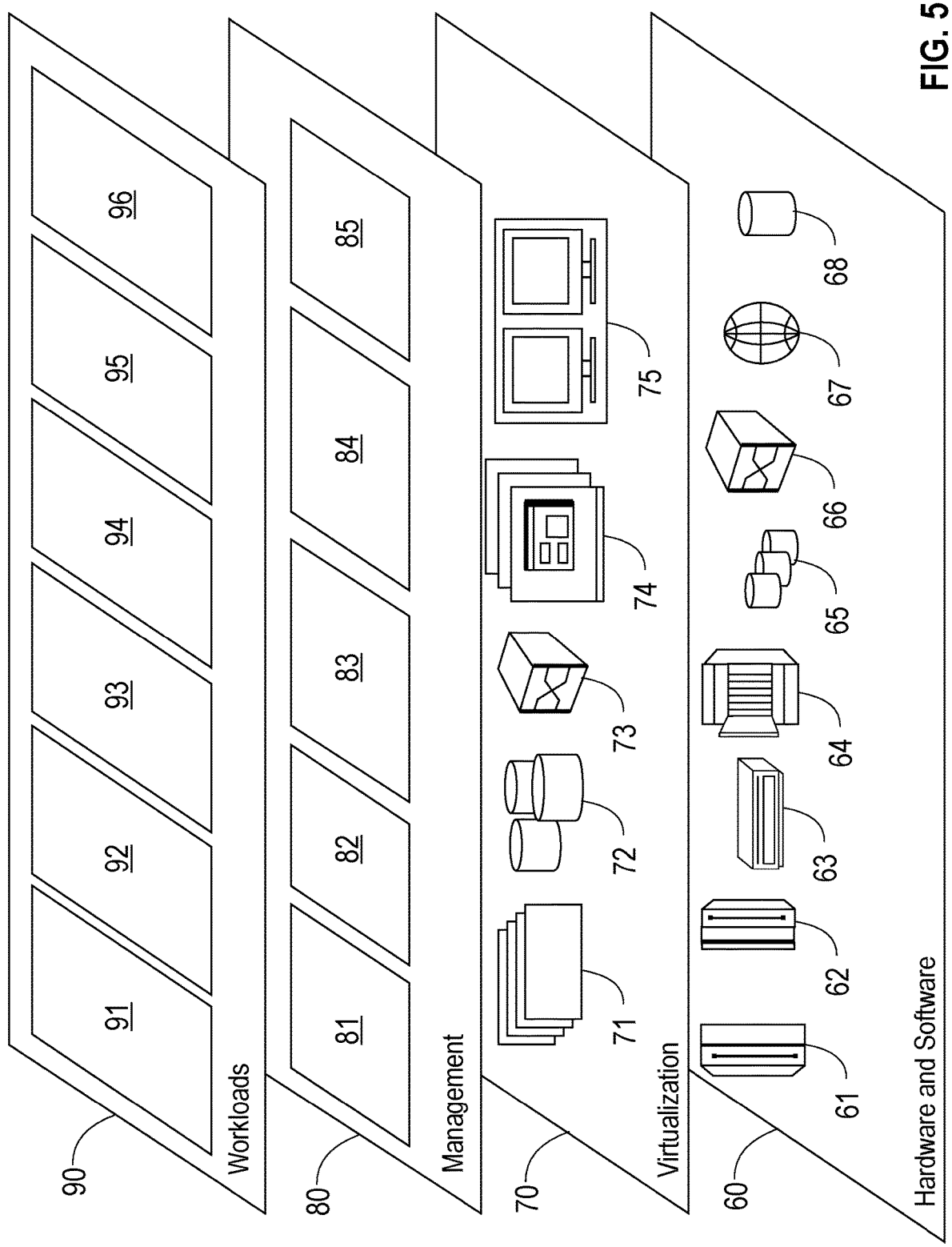
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and protecting workload in Kubernetes 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
obtaining, via a processor, an original docker image from a customer;
encrypting, via the processor, a disk image using content from the original docker image;
encrypting, via the processor, a bootloader;
creating, via the processor, a re-packaged image using the encrypted disk image and the encrypted bootloader;
deploying, via the processor, the re-packaged image by inserting the re-packaged image into a pod container; and
creating a secured Kubernetes pod for protecting workloads, wherein the secured Kubernetes pod has at least one virtual machine that includes the pod container.

2. The computer-implemented method according to claim 1, wherein the deployment of the re-packaged image uses a Kubernetes mutating admission controller to complete the insertion into the pod container.

3. The computer-implemented method according to claim 2, wherein the Kubernetes mutating admission controller uses webhook to modify the pod container definition at deployment time.

4. The computer-implemented method according to claim 1, wherein the secured Kubernetes pod further includes a runq sidecar container.

5. The computer-implemented method according to claim 4, wherein the runq sidecar container includes a shared volume.

6. The computer-implemented method according to claim 5, wherein the shared volume includes runq.

7. The computer-implemented method according to claim 5, wherein the shared volume includes qemu.

8. A system comprising:
a memory having computer readable instructions; and
one or more processors for executing the computer readable instructions, the computer readable instructions controlling the one or more processors to perform operations comprising:

obtaining an original docker image from a customer;
encrypting a disk image using content from the original docker image;
encrypting a bootloader;
creating a re-packaged image using the encrypted disk image and the encrypted bootloader;
deploying the re-packaged image by inserting the re-packaged image into a pod container; and
creating a secured Kubernetes pod for protecting workloads, wherein the secured Kubernetes pod has at least one virtual machine containing the pod container.

9. The system according to claim 8, wherein the deployment of the re-packaged image uses a Kubernetes mutating admission controller to complete the insertion into the pod container.

10. The system according to claim 9, wherein the Kubernetes mutating admission controller uses webhook to modify the pod container definition at deployment time.

11. The system according to claim 8, wherein the secured Kubernetes pod further includes a runq sidecar container.

12. The system according to claim 11, wherein the runq sidecar container includes a shared volume.

13. The system according to claim 12, wherein the shared volume includes runq.

14. The system according to claim 13, wherein the shared volume includes qemu.

15. A computer program product comprising a computer readable storage medium having program instructions embodied therewith, the program instructions executable by a processor to cause the processor to perform operations comprising:
obtaining an original docker image from a customer;
encrypting a disk image using content from the original docker image;
encrypting a bootloader;
creating a re-packaged image using the encrypted disk image and the encrypted bootloader;
deploying the re-packaged image by inserting the re-packaged image into a pod container; and
creating a secured Kubernetes pod for protecting workloads, wherein the secured Kubernetes pod has at least one virtual machine containing the pod container.

16. The computer program product according to claim 15, wherein the deployment of the re-packaged image uses a Kubernetes mutating admission controller to complete the insertion into the pod container.

17. The computer program product according to claim 16, wherein the Kubernetes mutating admission controller uses webhook to modify the pod container definition at deployment time.

18. The computer program product according to claim 15, wherein the secured Kubernetes pod further includes a runq sidecar container.

19. The computer program product according to claim 18, wherein the runq sidecar container includes a shared volume.

20. The computer program product according to claim 19, wherein the shared volume includes runq and qemu.

* * * * *